United States Patent
Woodell et al.

(10) Patent No.: US 7,492,305 B1
(45) Date of Patent: Feb. 17, 2009

(54) WEATHER PROFILE DISPLAY SYSTEM AND METHOD WITH UNCERTAINTY INDICATION

(75) Inventors: Daniel L. Woodell, Cedar Rapids, IA (US); Steve Paramore, Cedar Rapids, IA (US); Roy E. Robertson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 62 days.

(21) Appl. No.: 11/528,138

(22) Filed: Sep. 27, 2006

(51) Int. Cl.
*G01S 13/00* (2006.01)

(52) U.S. Cl. .................. 342/26 B; 342/26 R; 342/26 A; 342/26 C (58) Field of Classification Search ............... 342/26 A, 342/26 B, 26 C, 26 D, 36, 38, 61, 74, 75, 342/82, 89, 118–123, 142, 146, 147, 149, 342/153, 159–161, 175–186, 195, 197, 26 R; 345/581, 592, 589, 596, 619, 623, 440, 467, 345/4, 5, 902
See application file for complete search history.

(56) References Cited

U.S. PATENT DOCUMENTS

| | | | |
|---|---|---|---|
| 3,212,085 A | 10/1965 | Lhermitte et al. |
| 3,764,719 A | 10/1973 | Dell |
| 3,781,878 A | 12/1973 | Kirkpatrick |
| 3,885,237 A | 5/1975 | Kirkpatrick |
| 4,023,408 A | 5/1977 | Ryan et al. |
| 4,060,910 A | 12/1977 | Gell, Jr. |
| 4,198,635 A | 4/1980 | Gell, Jr. |
| 4,225,867 A | 9/1980 | Gell |
| 4,313,726 A | 2/1982 | Chase |
| 4,649,388 A | 3/1987 | Atlas |
| 4,796,153 A | 1/1989 | Amason et al. |
| RE33,152 E | 1/1990 | Atlas |
| 4,940,987 A | 7/1990 | Frederick |
| 5,049,886 A | 9/1991 | Seitz et al. |
| 5,111,400 A | 5/1992 | Yoder |
| 5,130,712 A | 7/1992 | Rubin et al. |
| 5,140,523 A | 8/1992 | Frankel et al. |
| 5,198,819 A | 3/1993 | Susnjara |
| 5,202,690 A | 4/1993 | Frederick |
| 5,262,782 A | 11/1993 | Rubin et al. |
| 5,265,024 A | 11/1993 | Crabill et al. |
| 5,311,183 A | 5/1994 | Mathews et al. |
| 5,323,170 A | 6/1994 | Lang |
| 5,359,330 A | 10/1994 | Rubin et al. |
| 5,371,505 A | 12/1994 | Michaels |
| 5,432,895 A | 7/1995 | Myers |

(Continued)

FOREIGN PATENT DOCUMENTS

WO     WO 98/22834 A1     5/1998

OTHER PUBLICATIONS

U.S. Appl. No. 11/519,564, filed Sep. 12, 2006, Woodell.

(Continued)

*Primary Examiner*—Thomas H Tarcza
*Assistant Examiner*—Peter M Bythrow (57) ABSTRACT

A weather radar system includes processing electronics. The processing electronics sense weather and determine an uncertainty factor. A display can provide visual indicia of the uncertainty factor for weather in response to the processing electronics. The display can be a vertical profile display. The weather radar system can be an avionic weather radar system.

20 Claims, 6 Drawing Sheets

U.S. PATENT DOCUMENTS

| | | | |
|---|---|---|---|
| 5,479,173 A | 12/1995 | Yoshioka et al. |
| 5,490,239 A | 2/1996 | Myers |
| 5,615,118 A | 3/1997 | Frank |
| 5,648,782 A | 7/1997 | Albo et al. |
| 5,751,289 A | 5/1998 | Myers |
| 5,757,322 A | 5/1998 | Ray et al. |
| 5,771,020 A | 6/1998 | Markson et al. |
| 5,828,332 A | 10/1998 | Frederick |
| 5,907,568 A | 5/1999 | Reitan, Jr. |
| 5,920,276 A | 7/1999 | Frederick |
| 5,945,926 A | 8/1999 | Ammar et al. |
| 5,959,567 A | 9/1999 | Wolfson et al. |
| 5,973,635 A | 10/1999 | Albo |
| 5,978,715 A | 11/1999 | Briffe et al. |
| 6,014,606 A | 1/2000 | Tu |
| 6,038,498 A | 3/2000 | Briffe et al. |
| 6,097,996 A | 8/2000 | Deker |
| 6,112,141 A | 8/2000 | Briffe et al. |
| 6,138,060 A | 10/2000 | Conner et al. |
| 6,154,169 A | 11/2000 | Kuntman |
| 6,163,756 A | 12/2000 | Baron et al. |
| 6,184,816 B1 | 2/2001 | Zheng et al. |
| 6,201,494 B1 | 3/2001 | Kronfeld |
| 6,215,294 B1 | 4/2001 | Coleman |
| 6,236,351 B1 | 5/2001 | Conner et al. |
| 6,240,369 B1 | 5/2001 | Foust |
| 6,246,367 B1 | 6/2001 | Markson et al. |
| 6,272,433 B2 | 8/2001 | Baron et al. |
| 6,275,231 B1 | 8/2001 | Obradovich |
| 6,285,298 B1 | 9/2001 | Gordon |
| 6,340,946 B1 | 1/2002 | Wolfson et al. |
| 6,356,843 B1 | 3/2002 | Baron et al. |
| 6,377,207 B1 | 4/2002 | Solheim et al. |
| 6,381,538 B1 | 4/2002 | Robinson et al. |
| 6,388,607 B1 | 5/2002 | Woodell |
| 6,388,608 B1 | 5/2002 | Woodell et al. |
| RE37,725 E | 6/2002 | Yamada |
| 6,405,133 B1 | 6/2002 | Schwinn et al. |
| 6,405,134 B1 | 6/2002 | Smith et al. |
| 6,424,288 B1 | 7/2002 | Woodell |
| 6,456,226 B1 | 9/2002 | Zheng et al. |
| 6,480,142 B1 | 11/2002 | Rubin |
| 6,501,392 B2 | 12/2002 | Gremmert et al. |
| 6,512,476 B1 | 1/2003 | Woodell |
| 6,542,809 B2 * | 4/2003 | Hehls, III ............... 701/120 |
| 6,542,825 B2 | 4/2003 | Jones et al. |
| 6,549,161 B1 * | 4/2003 | Woodell ............... 342/26 R |
| 6,560,538 B2 | 5/2003 | Schwinn et al. |
| 6,577,947 B1 | 6/2003 | Kronfeld et al. |
| 6,590,529 B2 | 7/2003 | Schwoegler |
| 6,603,425 B1 | 8/2003 | Woodell |
| 6,606,564 B2 | 8/2003 | Schwinn et al. |
| 6,650,972 B1 | 11/2003 | Robinson et al. |
| 6,686,872 B2 | 2/2004 | Vacanti |
| 6,703,944 B1 | 3/2004 | Obradovich |
| 6,828,922 B1 * | 12/2004 | Gremmert et al. .......... 340/949 |
| 6,845,324 B2 | 1/2005 | Smith |
| 6,856,908 B2 | 2/2005 | Devarasetty et al. |
| 6,879,280 B1 * | 4/2005 | Bull et al. ............... 342/26 B |
| 6,885,864 B2 | 4/2005 | McKenna et al. |

OTHER PUBLICATIONS

U.S. Appl. No. 11/191,883, filed Jul. 28, 2005, Woodell et al.
Nathanson, Fred E., "Radar and Its Composite Environment," *Radar Design Principles, Signal Processing and the Environment*, 1969, 5 pages, McGraw-Hill Book Company, New York et al.
Zipser, Edward J. et al., "The Vertical Profile of Radar Reflectivity of Convective Cells: A Strong Indicator of Storm Intensity And Lightning Probability?" Monthly Weather Review (Aug. 1994, vol. 122, pp. 1751-1759).
Maese, Timothy et al., "Preliminary Results of At-Sea Testing with the Lockheed Martin Tactical Environmental Processor," paper delivered at the BACIMO Conference in Fort Collins, Colorado, USA, Apr. 24-27, 2000, 9 pages.

* cited by examiner

WEATHER PROFILE DISPLAY SYSTEM AND METHOD WITH UNCERTAINTY INDICATION

BACKGROUND

The present application relates to weather radar systems. More particularly, the present application relates to a weather radar system that displays the presence of weather on a screen.

U.S. Pat. No. 6,424,288 invented by Daniel L. Woodell and assigned to the assignee of the present application discloses systems for and methods of displaying radar information using weather radar systems. Weather radar systems generally include an antenna, a receiver/transmitter circuit, a processor, and display. The processor is coupled between the display and the receiver/transmitter circuit. The receiver/transmitter circuit is coupled between the processor and the antenna.

The processor provides transmit signals through the receiver/transmitter circuit to the antenna to transmit radar beams. The processor receives radar return signals derived from radar returns received by the antenna. The radar return signals are provided to the processor via the receiver/transmitter circuit.

Conventionally, pilots use weather radar systems to detect and avoid hazardous weather. The radar return signals are processed to provide graphical images to a radar display. The radar display is typically a color multi-function display (MFD) unit that provides color graphical images to represent the severity and location of weather. Some aircraft weather radar systems also include other hazard detection systems such as a turbulence detection system. The turbulence detection system can provide indications of the presence of turbulence or other hazards. Conventional weather radar systems include those manufactured by Rockwell Collins, Inc., Honeywell International, Inc. and others.

U.S. Pat. No. 6,879,280, assigned to the assignee of the present invention, discloses an aircraft weather radar system. The system displays storm system characteristics on a vertical profile display. Uncertainty associated with storm tops can be displayed. The uncertainty can be related to a prediction of the altitude of the storm top when the aircraft reaches the location of the storm top.

According to another conventional system, turbulence regions detected by airborne weather radar are displayed using colored graphics in the form of amorphous areas (e.g., "blobs") for directly detected turbulence on a position plan display. A reasonable first order estimate for convective weather is the entire cloud mass contains turbulence that is hazardous. This is a typical turbulence avoidance method used by aircraft crews. Flying over convective weather produces a smoother, less hazardous ride that flying through convective weather. The areas or blobs of magenta color can often represent regions of inferred potential turbulence outside of the region of directly detectable turbulence. The uncertainty associated with hazard areas, such as these types of blobs has not been shown.

Heretofore, conventional weather radar systems are only able to produce uncertain hazard assessments for longer ranges. The uncertainty of those assessments is driven by the variableness of weather, the extreme low level radar returns in environments such as the tops or sides of conductive weather, and the vertical beam width inherent in weather radar systems. This uncertainty affects the display of hazards in the plan view, range/height displays and the potential panoramic (angle/angle) displays. Displaying hazards when the hazard is not necessarily accurately sensed can cause a flight crew to fly closer to a hazard or avoid a hazard that does not exist.

According to one example, if a conventional radar display displays a hazard at a long distance, a pilot using the display desires to determine if the current flight path is over the top of the hazardous weather in route. Given a 3.5 degree beam width in elevation on a conventional weather radar installation, the beam width is 35,000 feet at a 100 nautical mile range. Conventional weather radar systems have been able to effectively reduce the 35,000 foot beam width via signal processing techniques, but the amount of uncertainty can still be in the 10,000 foot range. Since uncertainty decreases with decreasing range to a weather target, hazardous regions above detectable convective cells may be detected later than desired forcing aircrews to make very late non-optimum avoidance maneuvers and may even cause periodic inadvertent thunderstorm penetrations. An uncertainty of 10,000 feet can also cause periodic unnecessary deviations if regions that have an uncertain risk assessment are found to be not hazardous as range decreases.

Thus, there is a need for a weather radar display that indicates errors associated with the display of hazards at longer ranges. Further still, there is a need for a weather radar display utilizing a plan view and range/height display configuration that provides an indication of uncertainty associated with weather height. Further still, there is a need for iconal representation that extends above a sensed weather hazard and indicates the uncertainty associated with the sensing of the weather hazard. Further still, there is a need for representing uncertainty associated with detected weather by utilizing density modulation, display dithering, or embedded recognizable patterns. Yet further there is a need to identify two cases of uncertainty: 1. uncertainty displayed by itself, and 2. regions that are hazardous and can be grown to include possible regions of hazard that have not been directly detected and displayed because of the possible uncertain nature of the hazard or measurement of the hazard.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

An exemplary embodiment relates to a weather radar system. The weather radar system includes processing electronics and a display. The processing electronics sense weather and determine an uncertainty factor for the weather. The display provides visual indicia of the uncertainty factor of the weather in response to the processing electronics.

Another exemplary embodiment relates to a method of displaying weather on a vertical profile display associated with an aircraft weather radar system. The method includes receiving radar returns at a plurality of tilt angles, processing the radar returns to determine a presence of weather, and processing the radar returns to estimate an altitude of the weather. The method also includes determining an uncertainty factor for the weather and providing an indication of the uncertainty factor of the weather on the vertical profile display.

Another exemplary embodiment relates to an apparatus for displaying weather for an aircraft. The apparatus includes means for determining the presence of weather from weather radar returns, means for determining an uncertainty factor for the weather in response to the weather radar returns and a range, and means for displaying the weather and an indication of the uncertainty factor.

Alternative examples and other exemplary embodiments relate to other features and combination of features, as may generally be recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Before describing in detail the particular improved system and method, it should be observed that the invention includes, but is not limited to a novel structural combination of conventional data/signal processing components and circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In conventional aircraft systems, air carriers wish to detect threatening weather which may be a threat to the aircraft or passengers. Such threatening weather may be detected using on-board weather radar systems, however, conventional systems are not well suited for estimating characteristics such as but not limited to the size, rate of growth, direction of change, maximum height, predicted change, etc. of detected storm systems nor are conventional systems well suited for graphically providing readily useable information to air crew, such as may be provided on a vertical weather profile display.

Figure 1:
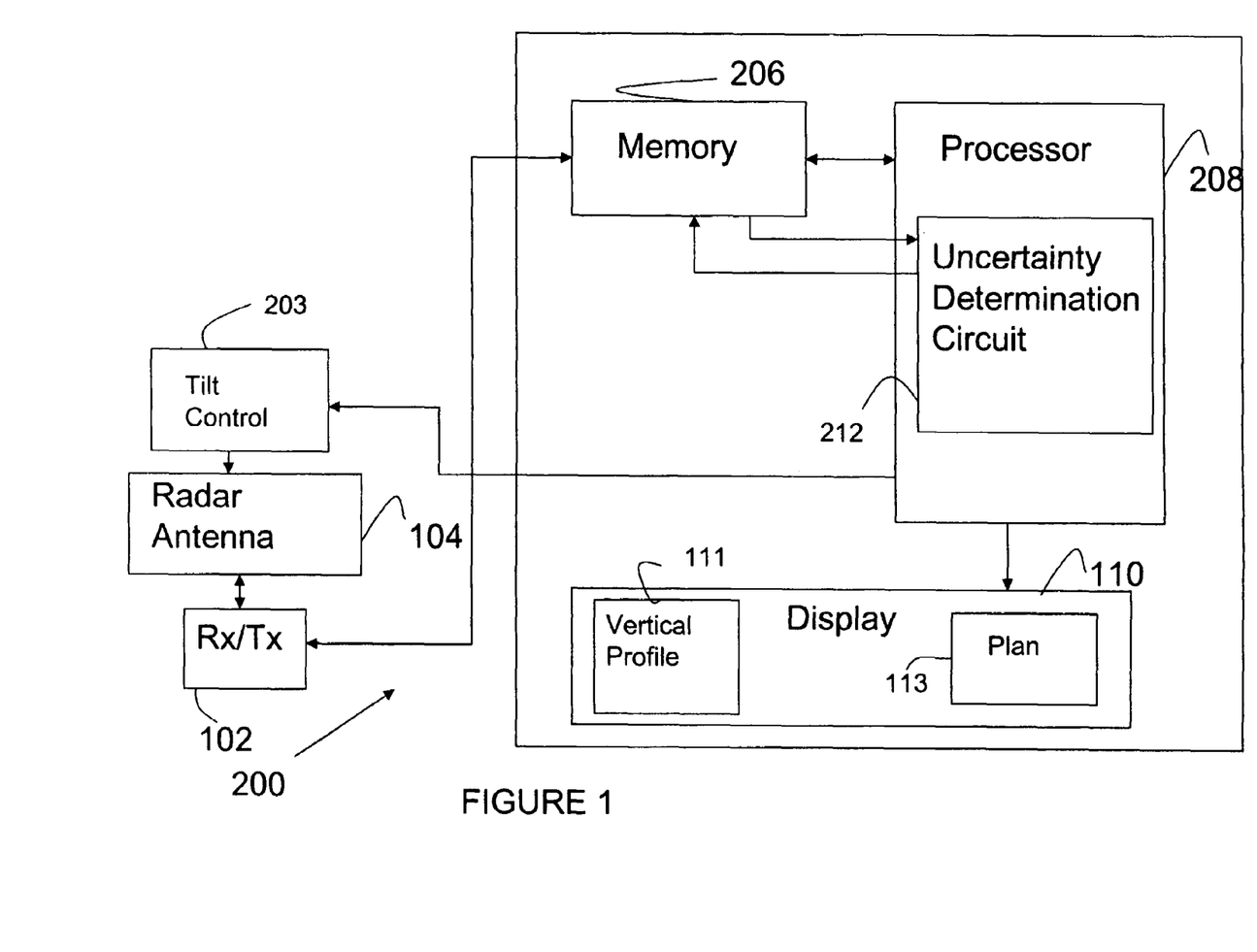
FIG. 1 is a general block diagram of a weather radar system in accordance with an exemplary embodiment.

Referring now to FIG. 1, a weather radar system 200 which may be used on an aircraft is depicted. Weather radar system 200 can be similar to the systems described in U.S. Pat. Nos. 6,879,280, 6,603,425 and 6,388,608, all incorporated herein by reference. In one embodiment, system 200 is an avionics multi-scan system manufactured by Rockwell Collins, Inc. and configured to include an uncertainty determination module, routine or circuit 212. Alternatively, a multi-beam radar that stores its data in a volumetric memory such as volumetric scanning systems manufactured by Honeywell, Inc. could be configured to include circuit 212 without departing from the scope of the invention. Uncertainty determination circuit 212 advantageously determines the presence of weather at altitudes, ranges and locations and assigns an uncertainty factor that can be displayed to the pilot of an aircraft.

Avionics weather radar system 200 includes a weather radar receiver/transmitter 102, a weather radar adjustable antenna 104, a processor 208, and a multi-scan, multi-tilt angle, memory 206. System 200 also includes a tilt control 203 for automatically controlling the tilt angle (mechanical or electronic) of the antenna 104; this auto control may include an additional manual control feature as well. System 200 can be similar to the system described in U.S. patent application Ser. No. 11/519,564, filed by Woodell on Sep. 12, 2006 and assigned to the assignee of the present application, incorporated herein by reference.

Multi-scan, multi-tilt angle, memory 206 is preferably capable of storing in a readily addressable and rapidly retrievable manner, at least two, but preferably four or more, data sets resulting from four or more antenna sweeps at different angles. Although preferred types of memory are discussed as memory 206, system 200 can utilize any type of storage system capable of storing radar returns or associated data for analysis/processing by processor 208. In one alternative embodiment, memory 206 can be a volumetric storage unit.

The data in multi-scan, multi-tilt angle, memory 206 or other storage unit can be used by uncertainty determination circuit 212 to determine weather that should be displayed on display 110.

Display 110 can be part of an avionic multi-function display (MFD) unit. Processor 208 can be a multi-scan, multi-tilt angle, weather radar and can perform the customary functions performed by a conventional weather radar return processing unit, plus it can perform several additional operations based upon the additional data available in multi-scan, multi-tilt angle, memory 206. In general, multi-scan, multi-tilt angle, processor 208 can merge or cross qualify portions, or ranges, of the radar returns of several different antenna sweeps at several different tilt angles, so that a single relatively clutter-free image is presented to the pilot based upon the several separate scans.

Processor 208 can operate according to the scanning process of U.S. Pat. No. 6,424,288. System 200 generally operates by transmitting at least two beams at different tilt angles; system 200 can use the GPS, terrain database, etc. to control the tilt control 203. These returns are stored in multi-scan, multi-tilt angle memory 206.

Known ground clutter is removed from each of the returns using well-known ground clutter suppression techniques. Also, ground clutter suppression techniques described in U.S. Pat. No. 6,603,425 could be implemented as well.

Preferably, processor 208 processes weather radar returns to identify or sense the presence of weather in front of or in view of the aircraft. Uncertainty determination preferably utilizes the altitude and the range to the weather to determine an uncertainty factor associated with the weather. The uncertainty factor can be a number, a rating, or other way of assigning a particular uncertainty level to the weather. Alternatively, the uncertainty factor can be a value representing the uncertainty associated with a height calculation of the weather. In one embodiment, the uncertainty level is related to a vertical dimension associated with the sensing of the height of the weather system. In a preferred embodiment, uncertainty can be appended to a region of hazard in two forms: 1. uncertainty associated with the dimension of the hazard and 2. uncertainty associated with a growing region of a hazard.

In general, processor 208 preferably determines the height of the weather by using power ratios of radar returns at different tilt angles as explained below. In addition, uncertainty determination circuit 212 determines the uncertainty associated with the weather. The uncertainty can be determined as a value reflecting the range of height from a minimum height to a maximum height.

Uncertainty of a vertical estimate of a weather hazard breaks into two pieces. Uncertainty is due to accuracies in the fundamental vertical reflectivity verses height estimate and estimations of hazard verses detectable radar parameters.

The accuracy of radar height estimate is similar to accuracies seen in classical monopulse radar systems with standard deviations of angle estimates to a target in the 1/10 to 1/15 of the real beam width depending on signal-to-noise and amount of filtering available. Elevation noise is the sin of the standard deviation of the angle estimate multiplied by range to target. As an example, targets at 40 nautical miles with a classic 3.2 degree beam width weather radar would be expected to produce vertical estimates with standard deviations in the 40 nmiles*6076 feet/nautical mile*sin(3.2/10)=1357 feet range. This estimate would be further degraded by variations in the vertical gradients of radar reflectivity for observations of different weather cells or cells being observed over some extended time. A reasonable approximation multiplies the estimated standard deviation of vertical estimate by a factor of about 2x. So in the 40 nautical mile example a standard deviation of 2600 to 2700 feet is expected.

Accordingly, in one embodiment, the uncertainty factor due to accuracy in the height estimate can be calculated according to the following equation:

$$\text{Uncertainty}_{height\ estimate} = 2X \text{ range } X \sin\frac{\theta}{n} \quad (1)$$

Where:
n=10-15
Range=distance to target in feet
θ=beam width in degrees.

Design criteria and system parameters can affect the choice of n which represents standard deviations of the angle estimates to a target. In Equation 1 above, n is equal to an integer between 10 and 15.

Further, turbulence in the top of a thunderstorm may extend past the observable radar top and in some cases may extend above the optical top of the storm cell for rapidly convecting storms. The minimum detectable radar reflectivity may be estimated. Using a mode of typical reflectivity verses height for a given weather feature, the amount of cloud height above the detectable radar tops may be estimated. For radar observable tops changing with time, the rate of increase may be used to estimate the amount of turbulence bow-wave the would exist above optical tops. Convective cells generally move upward no faster than 6000 feet per minute and significant turbulence is generally not seen at altitudes more than 4,000 feet above a convective cell. This suggest a control law of hazard being possible above the optical top by about 2/3 of the estimate cell growth rate in feet per minute. Over flight above that altitude generally produces a smooth non-hazardous flight.

According to one embodiment, uncertainty for hazards above a convective cell can be calculated according to the following equation:

$$\text{Uncertaninty as to hazards above convective cell} = \quad (2)$$
$$\text{estimate of cell growth rate in feet } per \text{ minute } X(2/3)$$

Accordingly, system 10 can utilize two uncertainty estimates. Uncertainty for a hazard determination above a convective cell can be calculated according to Equation 2 and uncertainty for weather height can be calculated to Equation 1. In addition, an overall uncertainty value can be calculated by taking the greater of the uncertainty for hazards above a convective cell and the uncertainty for weather height associated (e.g., uncertainty=the greater of Equation 1 or Equation 2). According to another embodiment, uncertainty can involve a sum of the results of Equations 1 and 2. Further, the uncertainty can be chosen for the particular types of weather or hazards shown on display 110. For example, if a turbulence hazard display is utilized the uncertainty is calculated according to equation 2.

After uncertainty determination circuit 212 assigns uncertainty to the weather based upon altitude and range, an indication of uncertainty is provided to the flight crew. In one embodiment, uncertainty determination circuit 212 provides an indication of uncertainty on weather provided in plan view 113 and a vertical profile view 111 on display 110. Preferably, stippling, density modulation, flashing, display dithering, or an embedded recognizable pattern is provided in both plan view 113 and vertical profile view 111. Alternatively, iconal and textual indications of uncertainty can be provided. In general, the uncertainty will be provided above the weather to indicate the uncertainty associated with the altitude determination associated with the weather on the vertical profile display. Alternatively, the uncertainty can only be shown on vertical profile display 111 to prevent clutter on plan display 113.

Display 110 can show vertical profile screen 111 and plan screen 113 simultaneously. Alternatively, only one of plan screen 113 and vertical profile screen 111 is shown on display 110 selectable by a pilot or other user.

Generally, the purpose of the uncertainty indication provides an indication of the band of altitude associated with the uncertainty of the height estimation. According to another alternative, circuit 212 can provide textual messages including the heights of uncertainty associated with the display of weather.

Uncertainty determination circuit 212 can be a hardware or software implemented apparatus. In one embodiment, circuit 212 is a software routine that operates within processor 208. Although shown as part of processor 208, circuit 212 can be a separate circuit or be provided between display 110 and processor 208. According to one embodiment, circuit 212 can be implemented upon its own processor platform.

In one embodiment, uncertainty determination circuit 212 determines the range and altitude associated with the sensed weather. The range and altitude are used so that uncertainty determination circuit 292 can characterize uncertainty for sensed weather for display on display 210.

Figure 2:
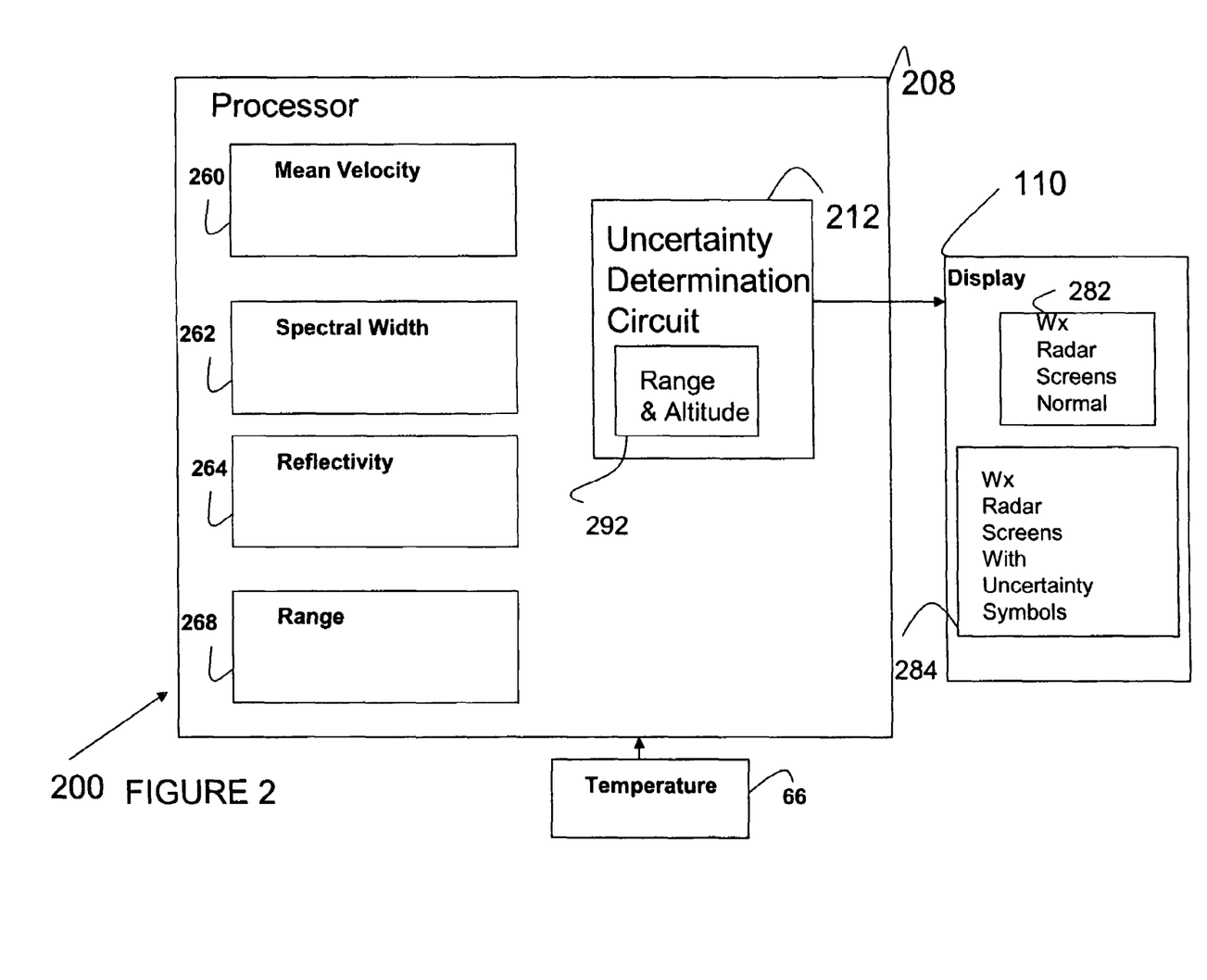
FIG. 2 is a more detailed general block diagram of the weather radar system illustrated in FIG. 2 in accordance with another exemplary embodiment.

With reference to FIG. 2, processor 208 of system 200 can receive additional parameters associated with the weather radar return data. The additional parameters can be utilized for hazard detection.

Processor 208 can receive a mean velocity parameter 260 and a spectral width parameter 262 derived from weather radar returns. Alternatively, other types of velocity parameters can be utilized. In addition, processor 208 can provide a reflectivity parameter 264 and a range parameter 268 to circuit 212. Computed range or range parameter 268 along with scan angle position can be used to plot the position of weather on display 208. Processor 208 can also provide a temperature parameter 66. Alternatively, a separate temperature sensor 66 can be coupled to processor 208. Parameters 260, 262, 264, and 268 can be computed by processor 208 using data stored in memory 206.

Processor 208 can use parameters 260, 262, 264, and 268 to determine hazards as discussed in U.S. patent application Ser. No. 11/191,883, incorporated herein by reference, filed Jul. 28, 2005, by Woodell et al. and assigned to the assignee of the present application incorporated herein by reference. Parameters 260, 262, 264, and 268 can also be used to determine the uncertainty of weather. For example, if processor 208 determines that the weather includes a convective cell that is growing, that characteristic can be considered when determining if the certainty of the height of the weather may have a larger uncertainty factor as discussed above.

Display 110 preferably includes a normal mode weather radar screen 282 and a uncertainty mode screen 284. In one preferred embodiment, the pilot can toggle between screens 282 and 284 based upon a manual input. Alternatively, screen 284 can automatically be provided on display 110 when the aircraft is in a particular flight mode.

In a preferred embodiment, processor 208 and circuit 212 are implemented in software subroutines. The routines can be executed on one or more digital signal processors associated with system 200. In one embodiment, system 200 uses a hardware platform of a WXR-2100 weather radar system manufactured by Rockwell Collins, Inc. or an RDR 4000 weather radar system manufactured by Honeywell International, Inc. However, the present invention is not limited to any type of hardware platform.

Figure 3:
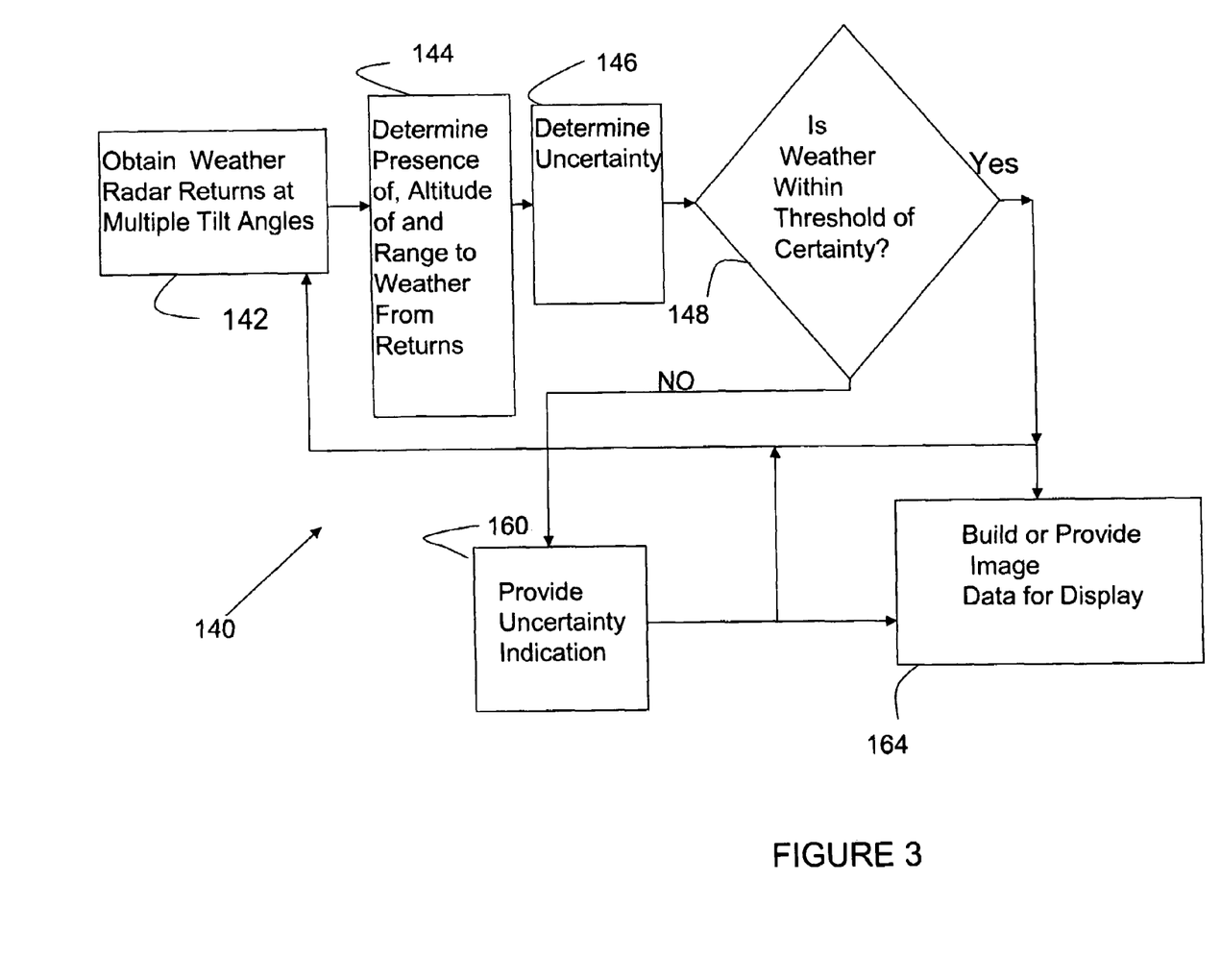
FIG. 3 is a flow chart showing operation of the system illustrated in FIG. 1 in accordance with a further embodiment.

With reference to FIG. 3, processor 208 of system 200 provides signals, either directly to receiver/transmitter circuit 102 or indirectly through memory 206, to provide radar beams at radar antenna 104. Preferably, processor 208 is configured to operate system 200 as a pulse Doppler multi-scan, multi-tilt angle radar system or a volumetric radar system in which radar beams are produced at more than one tilt angle. Processor 208 receives radar returns through receiver/transmitter circuit 102.

Processor 208 can receive the radar returns (or signals/data related thereto) directly or through memory 206 at a step 142. Receiver/transmitter circuit 102 can be a single path or can have separate circuits for a receive path and a transmit path. Processor 208 preferably determines power associated with the radar returns.

At a step 144, processor 208 processes the weather radar returns to determine the presence of weather and the altitude and range of weather. In one embodiment, the altitude of weather can be determined by comparing power levels of radar returns at different tilt angles. Uncertainty determination circuit 212 can use a subroutine or circuit 292 to determine the range and altitude of the weather and calculate the uncertainty associated with the weather (see Equation 1). Circuit 212 can also or alternatively can calculate uncertainty of hazards according to Equation 2.

The existence of weather at a given altitude can be estimated in a manner similar to that used for ground clutter suppression. According to such a technique, a given ratio of powers generated on one side of an overlapping beams can be mapped to a single angle within that overlapping beam set for any target. Knowing this mapping, aircraft altitude, target range, and beam set pointing angle; any power return ratio can be determined whether it is produced by a target in the vicinity of ground. A non-real time computation can be made for a quantized altitude set over all possible altitude cases and all range extents to determine the power ratios for possible ground targets. The result of this non-real-time calculation could be a look-up table of threshold values as a function of altitude and range or a set of polynomials selected by aircraft altitude that produce the threshold value as a function of radar range. After the addition of a margin term, the power ratio that is generated from the table or polynomial is then used in the real time processes of the radar to determine whether a target is a ground target or not.

In a similar fashion, the existence of weather at some given altitude can be determined. A vertical weather model of radar reflectivity verses altitude is assumed. One such model could have a constant radar reflectivity from the ground to maximum altitude of interest. Again for each quantized altitude with known antenna pointing angles, a non-real-time calculation can integrate radar reflectivities over each of the overlapping beams and the differences in return power between beams computed. For that beam set and weather model type, the change in power between the two beams can be computed for weather targets at the altitude of the aircraft for each possible range. Larger power differences are generated from targets below the threshold altitude while targets that produce less power differences are produced from targets that extend above the altitude of interest.

At a step 146, uncertainty determination circuit 212 determines the uncertainty associated with the weather. At a step 148, the uncertainty can be compared to a threshold range. The uncertainty can be expressed as a percentage of weather height. Alternatively, the uncertainty can be expressed as a plus or minus range (preferably in vertical feet) or a minimum height and a maximum height. In one embodiment, the threshold number is a fixed number 2-3 thousand feet or 5-10 percent of the altitude of the weather. In another embodiment, the uncertainty is only shown at particular ranges of display 110 (e.g., ranges over 40 nm, 80 nm, or 100 nm).

At a step 164, image data is provided for eventual conversion to a display signal for display 110. The image data is for providing visual indicia of significant weather.

At step 148, if the uncertainty of the weather is above a threshold, processor 208 advances to a step 160. In step 158, processor 208 provides indicia of the uncertainty. After step 160, processor 208 advances to step 164 where image data is provided for display 110, including the weather from step 148.

Figure 4:
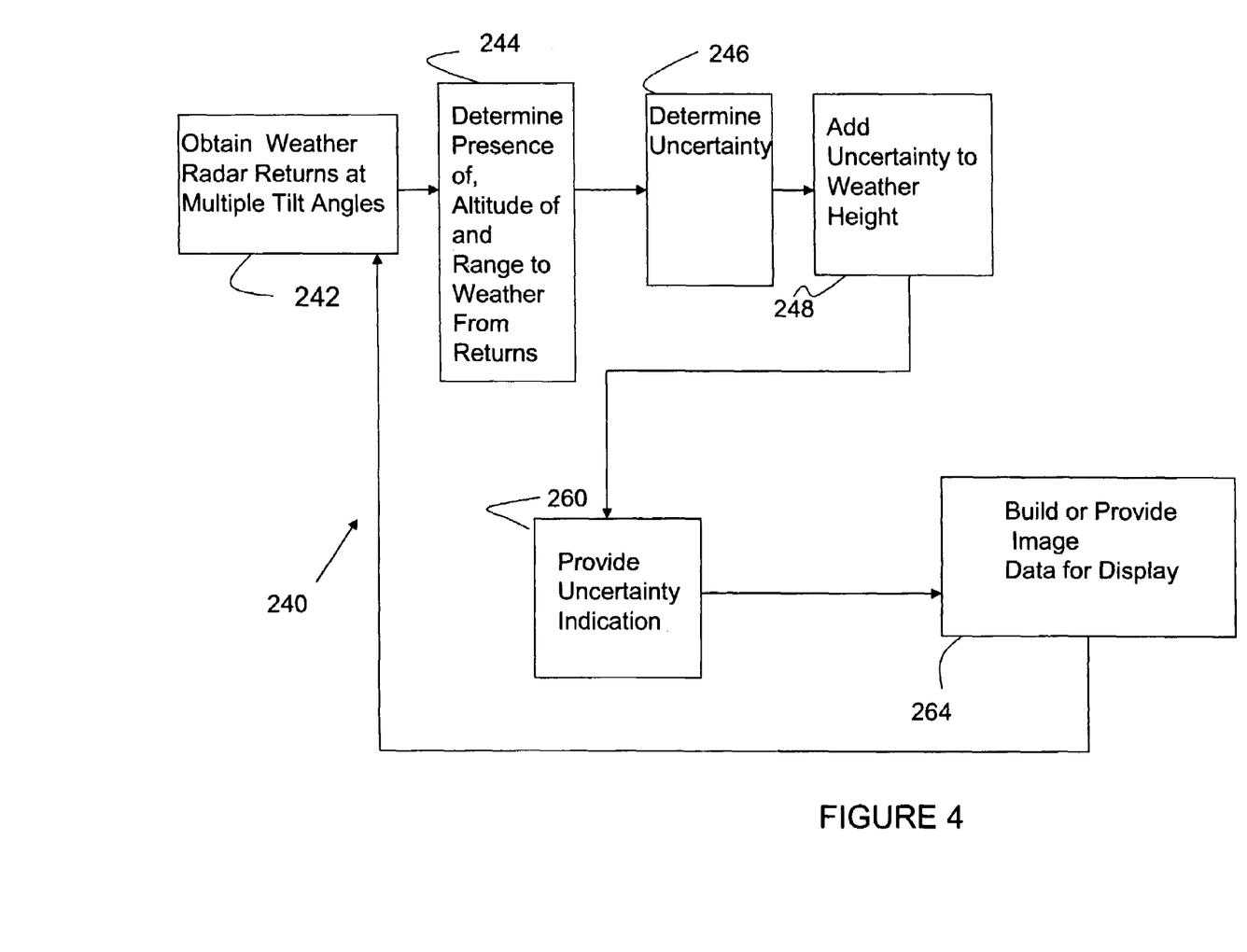
FIG. 4 is a flow chart showing operation of the system illustrated in FIG. 1 in accordance with yet another exemplary embodiment.

With reference to FIG. 4, a flow chart 240 similar to flow chart 140 shows operation of system 200 in accordance with another exemplary embodiment. At a step 242, weather radar returns are obtained at multiple tilt angles. At a step 244, the presence of, altitude of, and range to weather is determined from the returns. Alternatively, growth rate can be determined from the returns. At a step 246, uncertainty is determined. At a step 248, uncertainty is determined (preferably according to Equations 1 and 2) and is added to the weather height.

At a step 260, the uncertainty added to the weather height is indicated. Indicia for the uncertainty can include textual messages, audio message, background changes, outlines, cross section changes, flashing, display density modulation, dithering, embedded recognizable patterns, etc. At a step 264, image data is built or provided to display.

Figure 5:
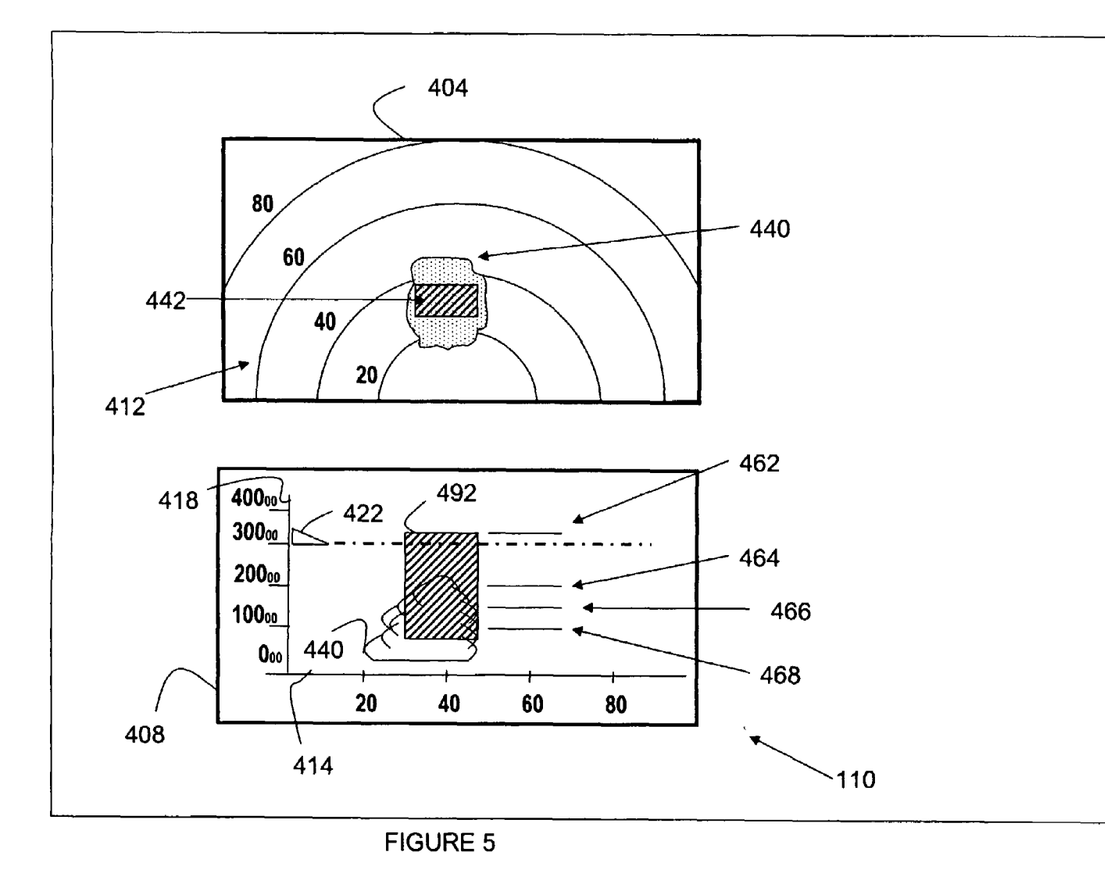
FIG. 5 is a drawing showing a vertical profile extending known and plan profile for the display of the system illustrated in FIG. 1 in accordance with an exemplary embodiment.

With reference to FIG. 5, display 110 includes a plan display 404 and a vertical profile display 408. Display 404 displays weather 440. Weather 440 is a weather cell shown by a stippled region. Uncertainty associated with weather 440 is shown by section 442. Range to weather 440 is shown by semicircular range lines 412. As shown in FIG. 5, weather 440 is at a range of 20 to 50 nautical miles.

Display 408 shows a Y axis 418 showing altitude in feet and an X axis 414 showing range in nautical miles. Aircraft symbol 422 is at an altitude of approximately 30,000 feet.

Uncertainty associated with the altitude of weather 440 is represented by image 442 on display 404 and image 492 on display 408. Images 442 and 492 can be a crosshatched region. Weather 440 can be represented by a graphical cloud image. As can be seen in FIG. 5, the uncertainty associated with weather 440 extends into the flight path of the aircraft.

A top (line 462) of the uncertainty region (of image 492) may extend above the altitude of the aircraft. A maximum height (line 464) of the detected weather 440 (e.g., hazard) is approximately 20,000 feet in this example display. A minimum height (line 466) for weather 440 is approximately 15,000 feet. A minimum height of hazard minus the estimation of uncertainty is at a level represented by line 468.

Most thunderstorms are considered hazardous all the way to the ground. While turbulence peaks in the freezing altitude to freezing altitude plus 10 kft, the risks to the aircraft are very high at low altitudes where the aircraft might maneuver into the ground. Accordingly, weather 440 could be shown as a hazard all the way to the ground. By viewing displays 404 and 408, a pilot can determine an appropriate route around or over weather represented by region 440 and image 492. Lines 462, 464, 466, and 468 can be displayed to assist the pilot's analysis of the weather.

Figure 6:
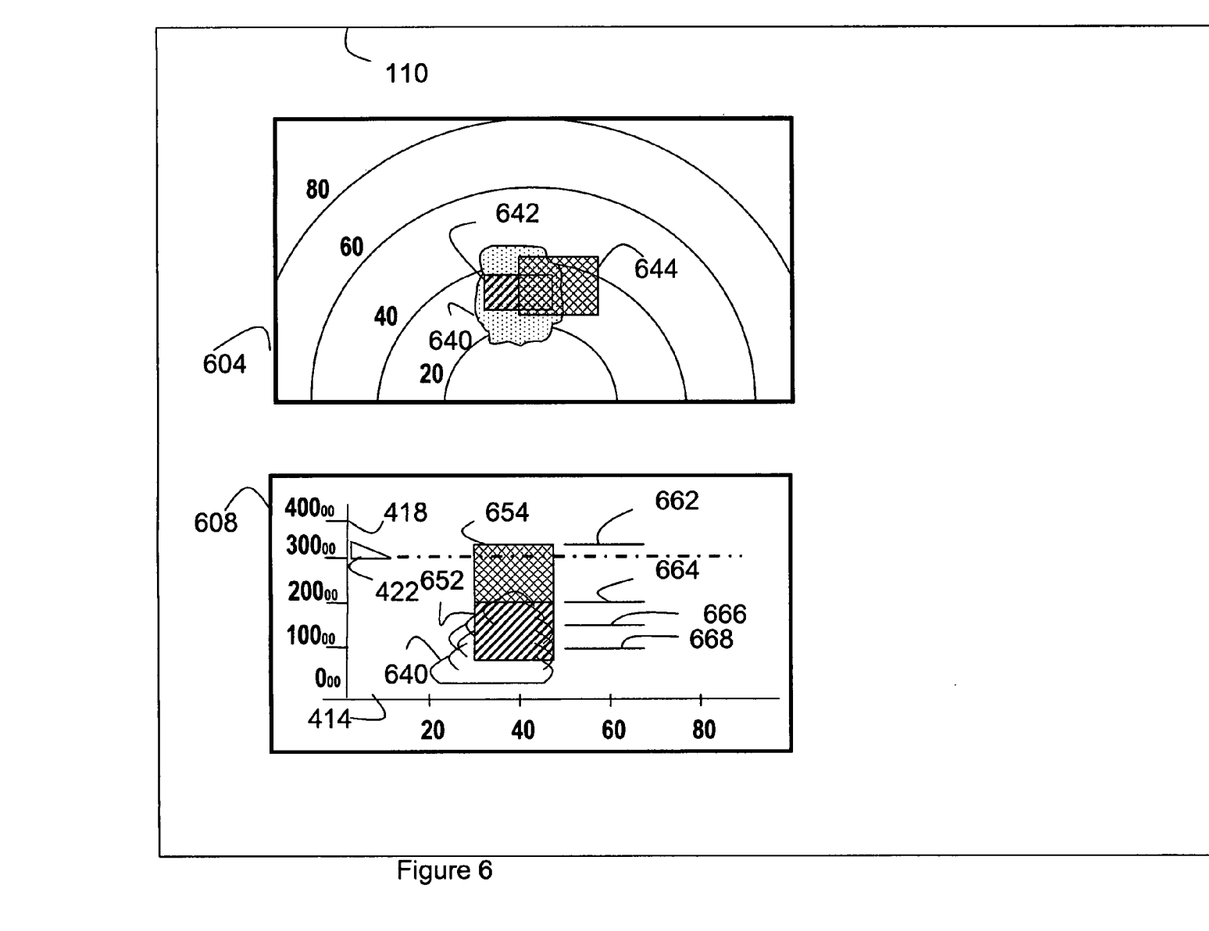
FIG. 6 of the drawing showing a vertical profile and plan profile for the display of the system illustrated in FIG. 1 in accordance with yet another exemplary embodiment.

With reference to FIG. 6, display 110 includes plan display 604 and vertical profile display 608. Display 110 shows a hazardous region of weather 640 (e.g., a weather cell or a thunderstorm) that has been extended vertically to include the region of possible hazard because of both uncertainty of the radar and environmental sampling processes. Therefore, display 110 can shows regions of hazards and regions of possible hazard as well as the uncertainty associated with those determinations.

Display 608 includes a Y axis showing altitude in feet and an X axis 414 showing range in nautical miles. Weather 640 is shown graphically by a graphical cloud image. Aircraft 422 is at an altitude of approximately 30,000 feet.

Display 604 displays weather 640 (e.g., a cell shown by a stippled region). Uncertainty associated with weather 640 is shown by images 642 and 644. Range to weather 640 is shown by semi-circular range lines 412. Images 642 and 644 can be cross-hatched regions.

On display 604, image 642 shows the additional hazard associated with weather 640. For example, image 642 can represent the area of extended turbulence above a weather cell. Section 642 represents the hazard associated with weather 640, including an estimation of hazard. Uncertainty associated with the measurement of weather 640 is represented by image 652 on display 604 and an image 654 on display 608. As can be seen in FIG. 6, the uncertainty (regions 652 and 654) associated with weather 640 extends into the flight path of the aircraft. Images 642, 644, 652 and 654 can be cross-hatched regions.

Uncertainty associated with the height of a hazard plus the uncertainty estimation is represented by image 654 on display 608. Image 652 represents the height of the hazard associated with weather 640. The height of the hazard can be greater then the height of the weather 640 that is detected. For example, the area above a weather cell may be hazardous even though the cell does not reach to a particular altitude.

A top of image 654 is the height of the hazard plus an estimation of uncertainty (a line 662). A maximum height (line 664) of the detected hazard associated with weather 640 (e.g., top of section 652) is approximately 20,000 feet in this example display. A minimum height of (the detected hazard) associated with weather 640 at a line 666. A minimum height of the weather hazard associated with 640 minus the estimation of uncertainty is at a line 668.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the radar system devices. For example, the type of device, communications bus, or processor used may differ. The systems and methods depicted and described are not limited to the precise details and conditions disclosed. Yet further, various representations of uncertainty and equations for determining uncertainty can be utilized. Furthermore, other substitutions, modifications, changes, and omissions may be made in the design, operating conditions, and arrangement of the exemplary embodiments without departing from the scope of the invention as expressed in the appended claims.

What is claimed is:

1. A weather radar processing system for use with a radar antenna for receiving radar signals at a plurality of tilt angles, a tilt element for controlling the radar antenna, and a display, the weather radar processing system comprising:

processing electronics configured to receive information from the antenna, the processing electronics configured to determine a height uncertainty and a hazard uncertainty, the processing electronics further configured to use the height uncertainty and the hazard uncertainty to determine an uncertainty factor for the weather; and the processing electronics are configured to cause the display to provide visual indicia of the uncertainty factor.

2. The weather radar system of claim 1, wherein the processing electronics are configured to provide signals to the display according to a first mode and a second mode, wherein the processing electronics are configured to provide the visual indicia of the uncertainty factor in the first mode and to not provide the visual indicia of the uncertainty factor in the second mode.

3. The weather radar system of claim 2, wherein the processing electronics determines an altitude of the weather by comparing the power of radar returns transmitted at different tilt angles of the radar antenna.

4. The weather radar system of claim 3, wherein the uncertainty factor is shown including a height uncertainty component and a hazard uncertainty component.

5. The weather radar system of claim 4, wherein the visual indicia is density modulation or other recognizable visual pattern.

6. The weather radar system of claim 1, wherein the uncertainty factor is added to a height for the weather and the weather is displayed on a display showing a vertical profile.

7. The weather radar system of claim 6, wherein the height uncertainty is computed using the following equation:

$$(\text{range to the weather}) * \sin\frac{\theta}{n},$$

where a, b, and n is an integer and θ is the radar beam width in degrees.

8. The weather radar system of claim 1, wherein the display includes a vertical profile portion and a plan portion and the visual indicia is shown on the plan portion and the vertical profile portion.

9. The weather radar system of claim 1, wherein the hazard uncertainty is computed using the following equation:

$$\frac{a}{b} * (\text{the rate of cell growth}),$$

where a and b are integers.

10. A method of displaying weather on a vertical profile screen of a display associated with an aircraft weather radar system configured to transmit and receive radar signals, the method comprising:
   processing the radar signals to determine a presence of weather;
   determining a height uncertainty associated with the weather;
   determining a hazard uncertainty associated with the weather;
   determining an uncertainty factor associated with the weather using the height uncertainty and the hazard uncertainty; and
   providing an indication of the uncertainty factor associated with the weather on the vertical profile screen.

11. The method of claim 10, wherein an indication of the weather is provided as an outline if the uncertainty factor associated with the weather is relatively high.

12. The method of claim 10, wherein the indication of the uncertainty factor is provided in response to a mode of flight.

13. An apparatus for displaying weather for an aircraft, the apparatus comprising:
   means for determining a presence of weather from weather radar returns;
   means for determining an uncertainty factor for the weather in response to the weather radar returns based upon a height uncertainty and a hazard uncertainty; and
   means for displaying indicia of the weather and the uncertainty factor, the uncertainty factor being displayed in plan view.

14. The apparatus of claim 13, wherein the indicia of the weather is displayed on a plan and vertical weather radar display.

15. The weather radar system of claim 1, wherein the processing electronics is further configured to determine the uncertainty factor by using the greater of the height uncertainty and the hazard uncertainty.

16. The weather radar system of claim 1, wherein the processing electronics is further configured to determine the uncertainty factor by adding the height uncertainty and the hazard uncertainty.

17. The method of claim 10, wherein the uncertainty factor is determined by using the greater of the height uncertainty and the hazard uncertainty.

18. The method of claim 10, wherein the uncertainty factor is determined by adding the height uncertainty and the hazard uncertainty.

19. The method of claim 10, wherein the height uncertainty is computed using the following equation:

$$(\text{range to the weather}) * \sin\frac{\theta}{n},$$

wherein n is an integer and θ is the radar beam width in degrees.

20. The method of claim 10, wherein the hazard uncertainty is computed using the following equation:

$$\frac{a}{b} * (\text{the rate of cell growth}),$$

where a and be are integers.

* * * * *